United States Patent [19]

Choe

[11] Patent Number: 4,603,187
[45] Date of Patent: Jul. 29, 1986

[54] POLYACETYLENIC COMPOSITIONS
[75] Inventor: Eui W. Choe, Randolph, N.J.
[73] Assignee: Celanese Corporation, New York, N.Y.
[21] Appl. No.: 710,766
[22] Filed: Mar. 11, 1985
[51] Int. Cl.$^4$ .............................................. C08F 138/00
[52] U.S. Cl. .................................... 526/285; 526/248; 564/305
[58] Field of Search ................. 526/248, 285; 564/305

[56] References Cited
U.S. PATENT DOCUMENTS
4,283,557  8/1981  Walton ................................ 526/248

Primary Examiner—Paul R. Michl
Attorney, Agent, or Firm—Depaoli & O'Brien

[57] ABSTRACT

This invention provides a novel class of polyacetylenic compositions.

Illustrative of the invention is a liquid crystalline polymer characterized by the repeating unit:

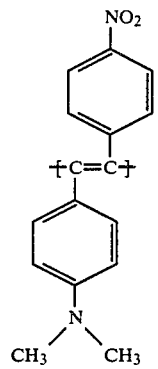

In the form of an optically transparent substrate, the polymer exhibits exceptional nonlinear third-order susceptibility effects.

9 Claims, No Drawings

POLYACETYLENIC COMPOSITIONS

BACKGROUND OF THE INVENTION

The field of nonlinear optics has potential for important applications in optical information processing, telecommunications and integrated optics.

Recently it has been recognized that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

U.S. Pat. No. 4,431,263 describes nonlinear optical materials based on polymerized diacetylenes. There is a detailed elaboration of physical and theoretical principles which underlie nonlinear behavior in organic systems. Reference is made to Physical Review A, 20 (No. 3), 1179 (1979) by Garito et al, entitled "Origin of the Nonlinear Second-Order Optical Susceptibilities of Organic Systems".

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C., 1983.

The above recited publications are incorporated herein by reference.

There is continuing research effort to develop new nonlinear optical organic systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide a novel polymeric composition having an extended conjugated polyunsaturated structure.

It is another object of this invention to provide a thermoplastic polyacetylenic composition having anisotropic properties.

It is another object of this invention to provide a liquid crystalline polyacetylenic composition which exhibits nonlinear optical effects.

It is a further object of this invention to provide a polymeric nonlinear optical medium which possesses a unique combination of thermoxidative stability and high laser damage threshold.

Other objects and advantages of the present invention shall become apparent from the accompanying description and example.

DESCRIPTION OF THE INVENTION

One or more objects of the present invention are accomplished by the provision of a novel polymeric composition which is characterized by the recurring monomeric unit:

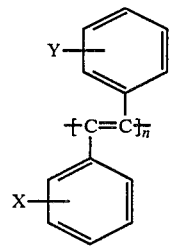

where X is an electron-donating substituent; Y is an electron-withdrawing substituent; and n is an integer of at least 3.

The term "electron-donating" as employed herein refers to organic substituents which contribute $\pi$-electrons when the conjugated electronic structure is polarized by the input of electromagnetic energy.

The term "electron-withdrawing" as employed herein refers to electronegative organic substituents which attract $\pi$-electrons when the conjugated electronic structure is polarized by the input of electromagnetic energy.

Illustrative of electron-donating substituents as represented by X in the above formula are amino, alkylamino, dialkylamino, 1-piperidino, 1-piperazino, 1-pyrrolidino, acylamino, hydroxyl, thiolo, alkylthio, arylthio, alkoxy, aryloxy, acyloxy, halo, alkyl, and the like.

Illustrative of electro-withdrawing substituents as represented by Y in the above formula are nitro, cyano, trifluoromethyl, acyl, carboxy, alkanoyloxy, aroyloxy, carboxamido, alkoxysulfonyl, aryloxysulfonyl, and the like.

In another embodiment the present invention provides a thermoplastic polyacetylenic composition having anisotropic properties which is characterized by the recurring monomeric unit:

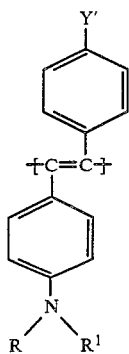

where R and $R^1$ are alkyl groups containing between about 1-4 carbon atoms, and R and $R^1$ taken together with the connecting nitrogen atom form an alicyclic substituent; Y' is a substituent selected from nitro, cyano and trifluoromethyl radicals; and the weight average molecular weight of the polymer is the range between about 1000-500,000.

A present invention polyacetylenic composition is prepared by the polymerization of an acetylene monomer corresponding to the formula:

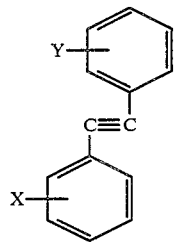

where X is an electron-donating substituent and Y is an electron-withdrawing substituent as previously defined.

The polymerization reaction proceeds readily if the acetylene monomer is exposed to ultraviolet radiation, or if the monomer is heated to a temperature sufficiently high for initiation of the polymerization reaction.

In a typical procedure the acetylene monomer is heated to form an anisotropic melt phase and as necessary the temperature is elevated until the polymerication reaction is initiated and completed. The polymerization reaction temperature usually will be in the range between about 200°-275° C. A polymerization catalyst such as a peroxide can be employed if it is desirable to accelerate the rate of polymerization.

A film of the polyacetylenic composition can be prepared by forming a thin substrate of the acetylene monomer, and then polymerizing the monomer in the substrate to form a corresponding thin polymeric film.

A present invention polyacetylenic composition can be formed into sheets, films, fibers or other shaped articles by conventional techniques such as extrusion, molding or casting.

The weight average molecular weight of a present invention polyacetylenic composition can be controlled within the range between about 1000-500,000, depending on the reactivity of the acetylene monomer and the polymerization conditions. In terms of inherent viscosity (I.V.), the preferred polyacetylenes commonly will exhibit an I.V. of about 2.0-10.0 dl/g when dissolved in a concentration of 0.1 percent by weight in pentafluorophenol at 60° C.

Acetylene Monomer Synthesis

The acetylene monomer utilized for preparation of the present invention polyacetylenic compositions can be synthesized by conventional procedures, such as by employing benzoin or cinnamic acid type of intermediates in the manner described in Organic Syntheses, coll. vol. III, 786 (1955) and coll. vol. IV, 857 (1963).

The following flow diagram illustrates a reaction scheme for synthesis of an acetylene monomer:

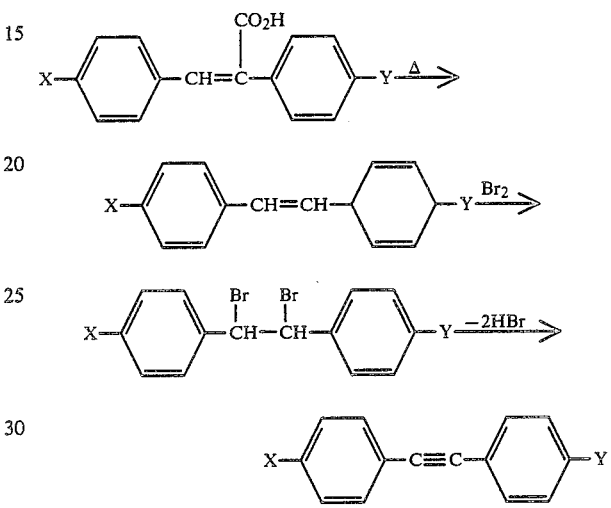

Nonlinear Optical Properties

In a further embodiment the present invention provides a liquid crystalline polyacetylenic composition having nonlinear optical properties which is characterized by the recurring monomeric unit:

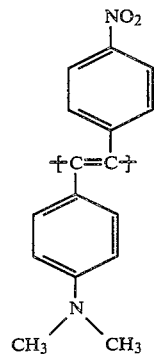

where said polymer has a weight average molecular weight in the range between about 2000-100,000, and exhibits a THG $\chi^{(3)}$ susceptibility value greater than about $10 \times 10^{-12}$ esu. The THG $\chi^{(3)}$ response time is less than about $1 \times 10^{-14}$ second.

The fundamental concepts of nonlinear optics and their relationship to chemical structures can be expressed in terms of dipolar approximation with respect to the polarization induced in an atom or molecule by an external field.

As summarized by Twieg and Jain in chapter 3 of ACS Symposium Series 233, the fundamental equation (1) below describes the change in dipole moment between the ground state $\mu_g$ and an excited state $\mu_e$ expressed as a power series of the electric field E which occurs upon interaction of such a field, as in the electric component of electromagnetic radiation, with a single molecule. The coefficient α is the familiar linear polarizability, β and γ are the quadratic and cubic hyperpolarizabilities, respectively. The coefficients for these hyperpolarizabilities are tensor quantities and therefore highly symmetry dependent. Odd order coefficients are nonvanishing for all molecules, but the even order coefficients such as β (responsible for second harmonic generation, SHG) are zero for centrosymmetric molecules. The odd order coefficient Y is responsible for third harmonic generation (THG).

Equation (2) is identical with (1) except that it describes a macroscopic polarization, such as that arising from an array of molecules in a crystal.

$$\Delta\mu = \mu_e - \mu_g = \alpha E + \beta EE + \gamma EEE + \ldots \quad (1)$$

$$P = P_0 + \chi^{(1)}E + \chi^{(2)}EE + \chi^{(3)}EEE + \ldots \quad (2)$$

Light waves passing through an array of molecules can interact with them to produce new waves. This interaction may be interpreted as resulting from a modulation in refractive index or alternatively as a nonlinearity of the polarization. Such interaction occurs most efficiently when certain phase matching conditions are met, requiring identical propagation speeds of the fundamental wave and the harmonic wave. Birefringent crystals often possess propagation directions in which the refractive index for the fundamental ω and the second harmonic 2ω are identical so that dispersion may be overcome.

A present invention polyacetylenic substrate typically is an optically clear thin film which exhibits hyperpolarization tensor properties such as second harmonic and third harmonic generation, and the linear electrooptic (Pockels) effect. For second harmonic generation, the bulk phase of the polymeric substrate does not possess a real or orientational average inversion center; the substrate is a noncentrosymmetric dipolar structure.

Harmonic generation measurements relative to quartz can be performed to establish the value of second-order and third order nonlinear susceptibility of the optically clear substrates.

A suitable apparatus for harmonic generation is schematically represented in Macromolecules, 15, 1386(1982). The apparatus is a Q-switched $Nd^{3+}$/YAG laser configured as an unstable resonator with polarization output coupling. The laser is operated just above threshold, supplying 2-5 per pulse of 1.06 μm radiation, which is focused on the surface of the thin substrate (20–30 μm thickness). Variation of the laser polarization is accomplished with a double-quarter wave rhomb rotator. The harmonic light is collected with f/16 optics, filtered from the fundamental light, and passed through a 20-cm focal length grating monochromator with an 8-nm bandwidth. Detection is accomplished with an 11-stage amplified photomultiplier tube. The system is integrated with a computer-controlled gated electronic detection and digitization apparatus.

The term "thin substrate" as employed herein refers to a continuous phase solid film, sheet or coating which has a thickness between about 10–500 microns.

The term "optically clear" as employed herein refers to a solid medium which is transparent or light transmitting with respect to incident fundamental light frequencies and harmonic light frequencies. In a laser frequency converter, a present invention nonlinear optical lens medium is transparent to both the incident and exit light frequencies.

Physical Properties

A present invention polyacetylenic substrate exhibits a unique combination of properties which are adapted for high strength-low weight applications.

A present invention sheet, film or fiber is characterized by a high tensile modulus. It also has excellent thermoxidative stability, and a high laser damage threshold.

The excellent physical properties are attributable mainly to the chemical structure of the polymer molecule chain which consists of an extended resonance-stabilized conjugated olefinic configuration, and which does not contain any hydrogen atoms in the polymeric backbone.

The following Examples are further illustrative of the present invention. The specific ingredients and processing parameters are presented as being typical, and various modifications can be derived in view of the foregoing disclosure within the scope of the invention.

EXAMPLE

A one liter three-necked flask equipped with a condenser, thermometer, mechanical stirrer, a dropping funnel and an argon supply is charged with 24 grams (0.0894 mole) of 1-(4-dimethylaminophenyl)-2-(4-nitrophenyl)ethylene and 600 ml of glacial acetic acid. Bromine (15.72 grams, 0.0983 mole) in an addition funnel is added into the flask over a one hour period at room temperature, and the resulting reaction mixture is heated at 90° C. for four hours.

After cooling, the reaction mixture is poured into water to precipitate the product. The product is filtered, washed with water, and dried to obtain a 60% yield of crude product. The crude product is recrystallized from 85 grams of acetic acid to obtain a 40% yield (12 grams) of a new compound 1-(4-dimethylaminophenyl)-2-bromo-2-(4-nitrophenyl)ethylene with a melting point of 174°–176° C. and a mass of m/e 338.

A three-necked flask equipped as described above is charged with 5 grams of 1-(4-dimethylaminophenyl)-2-bromo-2-(4-nitrophenyl)ethylene, 150 grams of potassium hydroxide, 35 ml of water and 350 ml of tetrahydrofuran. The reaction mixture is refluxed for 3 hours, and then cooled to room temperature. The tetrahydrofuran solution is separated from excess potassium hydroxide, and then poured into two liters of ice-water. The resultant precipitate is filtered and washed twice with water. Recrystallization of the product from 150 ml of nitromethane provides a yield of 3.8 grams (96.5%) of 4-dimethylamino-4-nitrophenylacetylene, as birefringent needles with a melting point of 217° C. Mass spectral analysis indicates a molecular ion peak at m/e 266.

The monomeric acetylene product undergoes an anisotropic melt phase, and polymerizes upon heating above about 220° C. into anisotropic poly(4-dimethylaminophenyl-4-nitrophenylacetylene) that shows a third order susceptibility of $5\times10^{-12}$ e.s.u. as determined by the method described on page 7 by Garito in "Nonlinear Optical Properties of Organic and Polymeric Materials", ACS Symposium Series 233, American Chemical Society, Washington, D.C. 1983.

What is claimed is:

1. A polymeric composition which is characterized by the recurring monomeric unit:

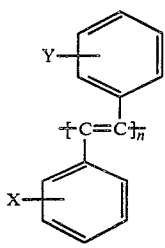

where X is an electron-donating substituent; Y is an electron-withdrawing substituent; and n is an integer of at least 3.

2. A thermoplastic polyacetylenic composition having anisotropic properties which is characterized by the recurring monomeric unit:

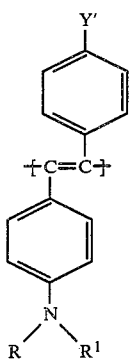

where R and $R^1$ are alkyl groups containing between about 1–4 carbon atoms, and R and $R^1$ taken together with the connecting nitrogen atom form an alicyclic substituent; Y' is a substituent selected from nitro, cyano and trifluoromethyl radicals; and the weight average molecular weight of the polymer is in the range between about 1000–500,000.

3. A liquid crystalline polyacetylenic composition having nonlinear optical properties which is characterized by the recurring monomeric unit:

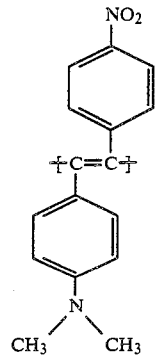

wherein said polymer has a weight average molecular weight in the range between about 2000–100,000, and exhibits a THG $\chi^{(3)}$ susceptibility value greater than about $10 \times 10^{-12}$ esu.

4. 1-(4-dimethylaminophenyl)-2-bromo-2-(4-nitrophenyl)ethylene.

5. A process for production of a polyacetylenic composition which comprises polymerizing an acetylene monomer corresponding to the formula:

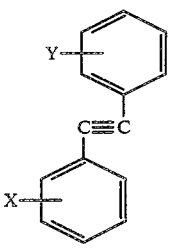

where X is an electron-donating substituent, and Y is an electron-withdrawing substituent.

6. A process in accordance with claim 5 wherein the X substituent is dimethylamino.

7. A process in accordance with claim 5 wherein the Y substituent is nitro.

8. A process in accordance with claim 5 wherein the Y substituent is cyano.

9. A process in accordance with claim 5 wherein the Y substitutent is trifluoromethyl.

* * * * *